US012612998B2

(12) United States Patent
Fujii et al.

(10) Patent No.: US 12,612,998 B2
(45) **Date of Patent: *Apr. 28, 2026**

(54) GAS FILLING DEVICE

(71) Applicant: Tatsuno Corporation, Tokyo (JP)

(72) Inventors: Rena Fujii, Tokyo (JP); Ko Saito, Tokyo (JP); Katsumi Nagai, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 277 days.

This patent is subject to a terminal disclaimer.

(21) Appl. No.: 18/505,454

(22) Filed: Nov. 9, 2023

(65) Prior Publication Data

US 2024/0167628 A1 May 23, 2024

(30) Foreign Application Priority Data

Nov. 18, 2022 (JP) ................................ 2022-184631

(51) Int. Cl.
*F17C 5/00* (2006.01)

(52) U.S. Cl.
CPC ........ *F17C 5/00* (2013.01); *F17C 2205/0332* (2013.01); *F17C 2205/0376* (2013.01); *F17C 2221/012* (2013.01); *F17C 2227/03* (2013.01); *F17C 2250/0443* (2013.01); *F17C 2265/065* (2013.01)

(58) Field of Classification Search
CPC .............. F17C 13/08; F17C 2205/0107; F17C 2209/22; F17C 2209/228; F17C 2221/012; F17C 2227/03; F17C 2265/065; F17C 5/00; F17C 2205/0332; F17C 2205/0376; F17C 2250/0443; B23P 11/00; Y10T 29/49904; Y10T 29/49963; B60S 5/02; B67D 7/84
USPC ............................................ 141/231; 29/428
See application file for complete search history.

(56) References Cited

U.S. PATENT DOCUMENTS

2012/0024892 A1* 2/2012 Bartlett .................... B67D 7/80 137/565.17
2017/0009939 A1* 1/2017 Takahashi ................. F17C 5/02
2021/0285602 A1* 9/2021 Yoshida .................... F17C 5/06

FOREIGN PATENT DOCUMENTS

JP 2014109350 A 6/2014

* cited by examiner

*Primary Examiner* — Christopher M Afful
(74) *Attorney, Agent, or Firm* — Stetina Garred Brucker & Newboles

(57) ABSTRACT

To provide a gas filling device in which its assembly work is simplified by unitizing a housing body and the total number of assembly steps is reduced, thereby achieving high production efficiency. A gas filling device 100 according to the present invention including a lower unit 10 housing a heat exchanger 13 on a base frame 1; an intermediate unit 20 located above the lower unit 10 and housing a display; a top unit 30 located above the intermediate unit 20 and housing a flow meter 33; and side units 40 located on both sides of the lower unit 10 and the intermediate unit 20 and housing filling hoses having filling nozzles at their tips.

7 Claims, 10 Drawing Sheets

GAS FILLING DEVICE

CROSS-REFERENCE TO RELATED APPLICATIONS

The present application claims priority to Japanese Patent Application No. 2022-184631 filed on Nov. 18, 2022, the disclosure of which is incorporated herein by reference.

STATEMENT RE: FEDERALLY SPONSORED RESEARCH/DEVELOPMENT

Not Applicable

BACKGROUND

1. Field of the Invention

The present invention relates to a gas filling device for filling a vehicle (FCV) or the like with gaseous fuel such as hydrogen gas.

2. Description of the Related Art

Japan lacks fossil fuels and relies on imports from overseas, making it susceptible to international developments. Therefore, in recent years, hydrogen, which can be produced from various resources, has been attracting attention because it is environmentally friendly and useful for energy security. The applicant has also proposed, to address this environmental problem, gas filling devices that stably and efficiently fill gas fuel into on-board tanks installed in vehicles such as fuel cell vehicles and hydrogen vehicles that use hydrogen gas as fuel in the Japanese Patent Publication No. 2014-109350. Although the conventional technology is effective, when assembling a gas filling device, devices such as flowmeters, valves, piping, gas pipe cooling parts, etc. are installed and connected to a frame after an entire frame is assembled.

However, since bolt fastening holes in the frame are loose in position and size, assembly errors may cause distortion of the frame structure. In addition, since the gas pipe cooling unit is the smallest size that can be installed within the frame of a main body housing, and is a heavy device weighing approximately 200 kg, it must be installed within the frame while being moved and made plumbing connections by multiple people. The piping has a primary side piping and a secondary side piping, and it required skill to accurately connect each without damaging metal seals between gas pipes and the cooling section. If the metal seal parts are damaged, hydrogen gas may leak therefrom, potentially causing a disaster such as an explosion.

The contents of Japanese Patent Publication No. 2014-109350 is incorporated herein by reference in its entirety.

BRIEF SUMMARY

The present invention has been proposed in view of the above-mentioned problems of the prior art, and the object thereof is to provide a gas filling device in which its assembly work is simplified by unitizing a housing body and the total number of assembly steps is reduced, thereby achieving high production efficiency.

A gas filling device 100 of the present invention is characterized by composed of a lower unit 10 that houses a heat exchanger 13 on a base frame 1; an intermediate unit 20 that is located above the lower unit 10 and houses a display; a top unit 30 located above the intermediate unit 20 and houses a flow meter 33; and side units 40 located on both sides of the lower unit 10 and the intermediate unit 20 and housing filling hoses having filling nozzles at their tips.

In the present invention, each unit is provided with a positioning hole LH, and a pin can be inserted into the positioning hole LH formed at a location where each unit overlaps. The positioning hole LH is preferably configured so that the pin can be removed after each unit or a unit and a device are connected (for example, bolted together). The positioning holes LH can be used to connect units to each other or to devices, or to connect cables (harnesses), etc., by using binding bands, if necessary.

Further, in the present invention, it is preferable that the base frame 1 is provided at the lowest part (foundation part), and that the base frame 1 has a notch 1A formed therein.

According to the present invention having the above-described configuration, each device can be arranged in advance for each unit, so that the total number of assembly steps can be reduced. Furthermore, compared to the work of fixing devices within the frame of the gas filling device 100, which is constructed by assembling units together, the work of fixing devices to individual units is easier, and the labor involved in the work is significantly reduced.

In the present invention, each unit is provided with a positioning hole, and if the positioning hole LH formed at an overlapping part of each unit has a function that allows insertion of a pin LP, before each unit can be firmly connected with each other by bolts, the pin LP is inserted into the positioning hole LH and is temporarily fastened thereto and then each unit can be fastened with bolts, etc., which reduces assembly errors in an assembled state of the units and distortion of the frame structure. For example, installing heavy equipment like the heat exchanger 13 in the unit can be facilitated by pre-installing it in the unit, and other equipment that should be connected to the heat exchanger 13 via piping can also be accurately installed using positioning holes. Even non-experts can connect the primary and secondary piping accurately without damaging the metal seals between the gas pipe cooling section. As a result, leakage of hydrogen gas due to damage to the metal seals can be prevented, and disasters such as explosions can be suppressed. Then, after the units or the unit and the device are connected (for example, bolted together), the inserted pin can be removed. Further, a binding band can be inserted into the positioning hole LH if necessary, so that, for example, wiring can be bundled with the binding band.

In the present invention, if the base frame 1 is provided at the lowest part (foundation part) and the notch 1A is formed in the base frame 1, the notch 1A can be used when tightening an anchor bolt AB when installing the base frame. The notch 1A allows an operator to insert his/her hand or a tool (for example, a wrench) into the base frame 1 in close proximity to the base frame 1. Compared to the case where the base frame is not provided with a notch like in a conventional gas filling device, the operator inserts his/her hand through the notch 1A formed in the base frame 1, or the operator uses the tool to approach or reach the location to be worked, which facilitates fastening work for anchor bolts and improves work efficiency.

DETAILED DESCRIPTION

Figure 1:
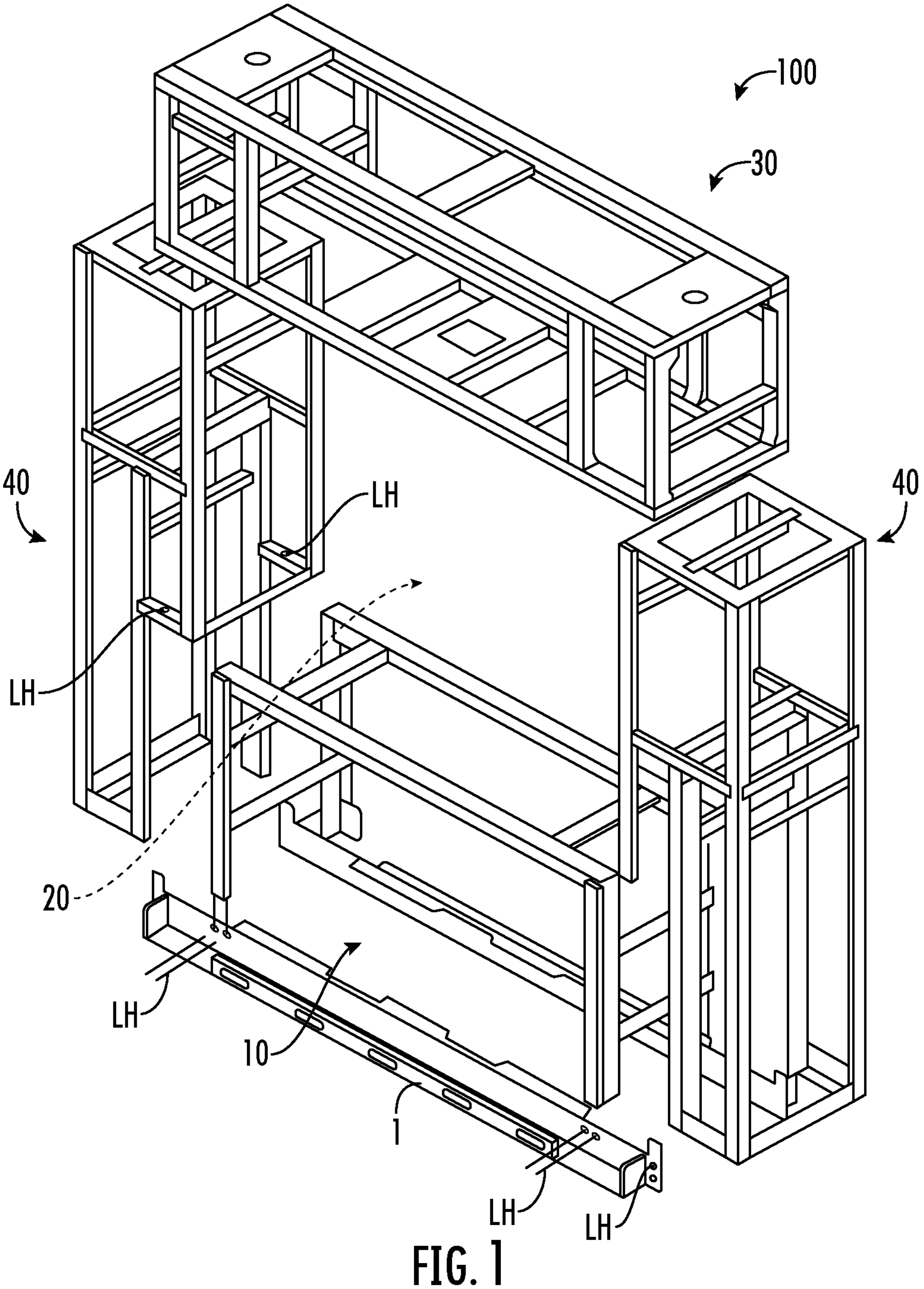
FIG. 1 is an exploded perspective view showing each unit constituting a gas filling device according to the present invention.
Figure 2:
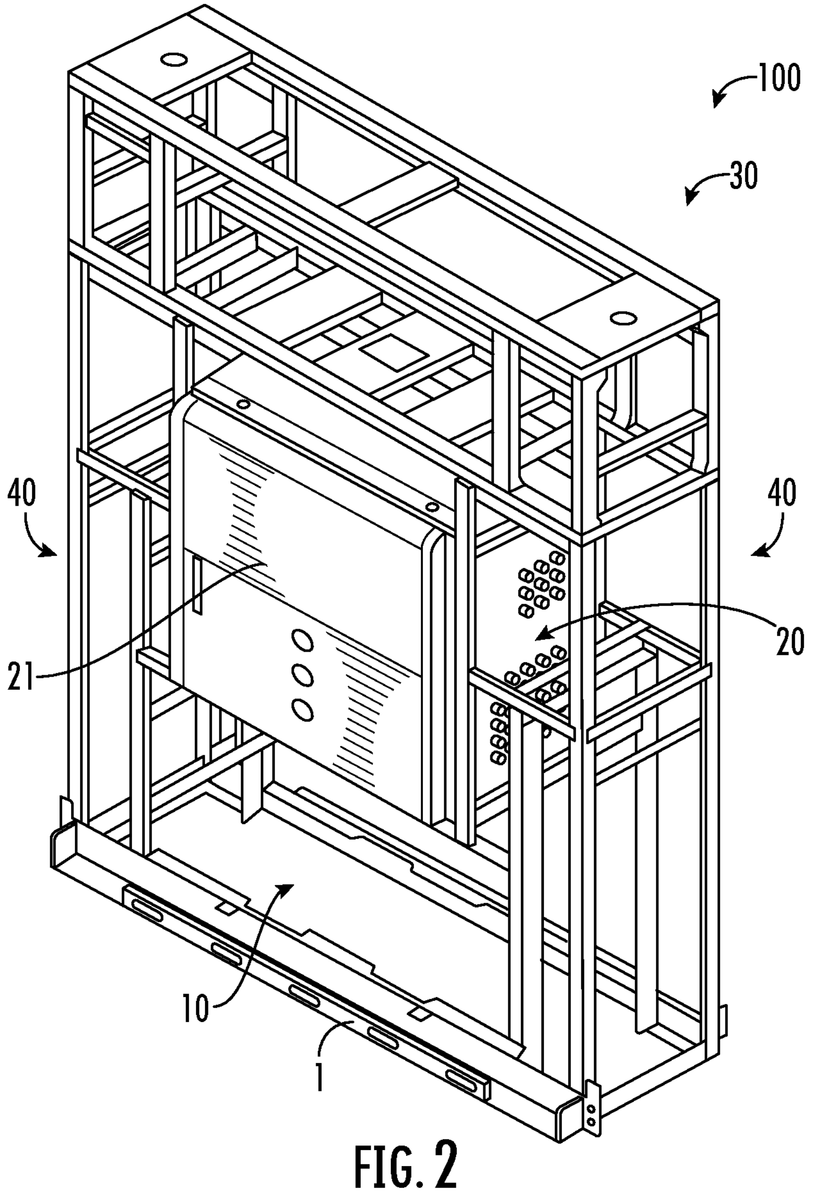
FIG. 2 is a perspective view showing the unit shown in FIG. 1 in an assembled state.

Hereinafter, an embodiment of the present invention will be described below with reference to the accompanying drawings. In FIG. 1, a gas filling device 100 is composed of a lower unit 10, an intermediate unit 20, a top unit 30, and side units 40 on both sides. Inside each unit, there are devices necessary for filling hydrogen, etc. The intermediate unit 20 is located above the lower unit 10, and the top unit 30 is located above the intermediate unit 20. The side units 40 are located on both sides of the lower unit 10 and the intermediate unit 20, and a base frame 1 is located below the lower unit 10. In FIG. 1, illustration of the intermediate unit 20 is omitted, and it is indicated by a broken leader line and the reference numeral 20. In FIG. 1, these units are shown before they are assembled (or fastened together). The assembled state of these units is shown in FIG. 2. In FIG. 2, a display panel 21 is attached to the front surface of the intermediate unit 20. The panels attached to the front of each unit will be described later with reference to FIG. 4.

Figure 3:
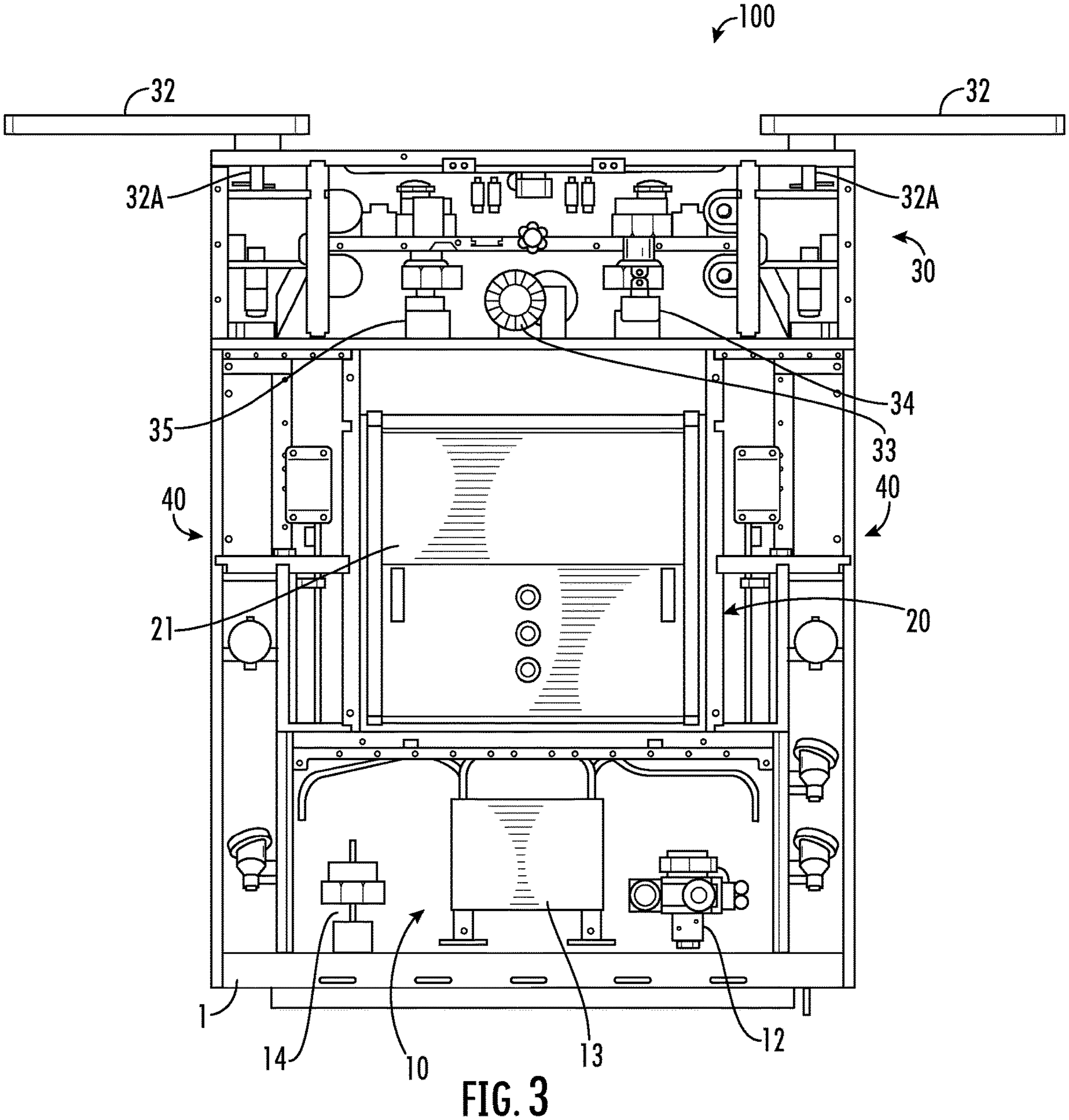
FIG. 3 is a front view showing various devices housed in or attached to each unit.
Figure 6:
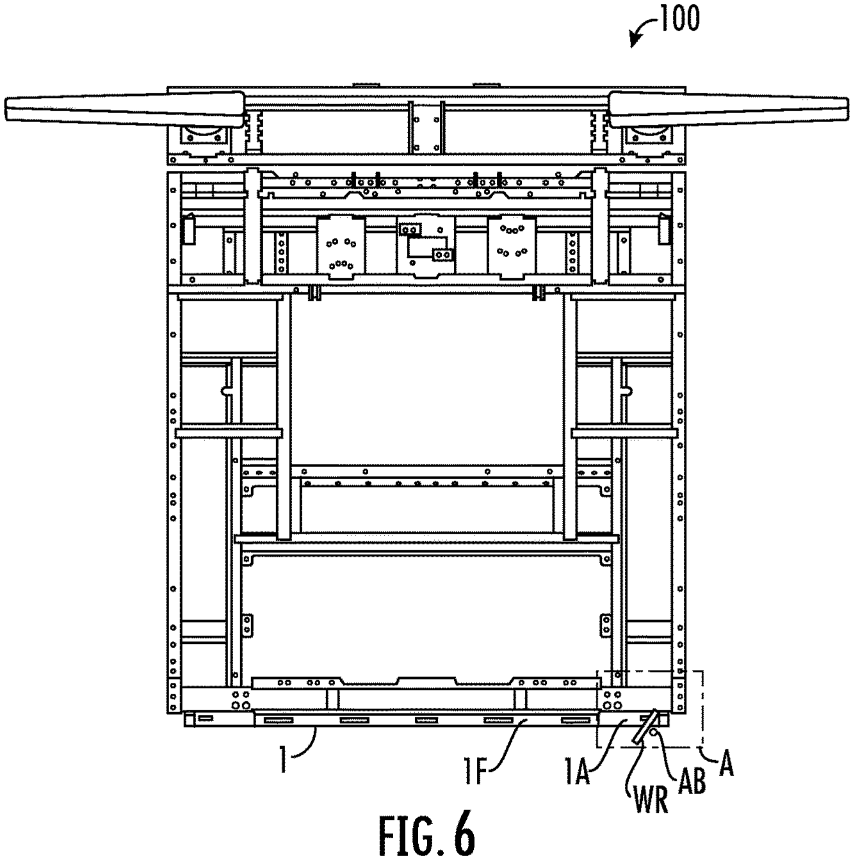
FIG. 6 is a front view of the gas filling device according to the present invention.

In FIGS. 1, 2, and 6, in order to simplify illustration, only frames constituting each unit are shown, and various filling devices housed in or attached to each unit are not shown. FIG. 3 shows various filling equipment housed or attached within each unit. In FIG. 3, the top unit 30 includes, for example: a support arm 32 for suspending and supporting a filling hose (not shown); a support arm rotation mechanism 32A; and a flow meter 33, a cutoff valve 34, an outlet side pressure relief valve 35, piping, etc. forming a hydrogen gas flow path. The side unit 40 is, for example, provided with a filling hose connected to a filling nozzle (not shown), as shown in FIG. 3, filling nozzles and filling hoses (two filling nozzles and filling hoses connected thereto in the illustrated embodiment) are housed in the side unit 40. The lower unit 10 is provided with, for example, a flow rate adjustment valve 12, a gas pipe cooling section (including a heat exchanger 13, piping, etc.), an inlet side depressurization valve 14, etc., and these devices constitute a hydrogen gas flow passage. The base frame 1 is arranged below the lower unit 10. Regarding the intermediate unit 20, only the display panel 21 attached to the front surface of the intermediate unit 20 is shown in FIG. 3. Although not shown, a filling amount indicator (counter) and necessary electronic equipment are provided in the intermediate unit 20.

In the illustrated embodiment, each of the units shown in FIGS. 1 and 2 (the lower unit 10, the intermediate unit 20, the top unit 30, the side units 40) is configured as a so-called "subassembly." In the illustrated embodiment, the gas filling device 100 is manufactured by arranging various filling devices at predetermined positions within each unit and attaching them, and then coupling (assembling) the units. Therefore, various equipment necessary for hydrogen filling can be installed in each unit before assembling the four kinds of units. Compared to the work of arranging and fixing various devices in the assembled gas filling device 100, the work of fixing various devices for hydrogen filling in each individual unit is easier, and work efficiency is improved by the case. Furthermore, the labor required for assembly work is reduced. However, it is also possible to assemble each unit (lower unit 10, intermediate unit 20, top unit 30, side units 40) at a stage before installing various filling equipment, and then install various devices inside each assembled unit (inside the frame).

Figure 4:
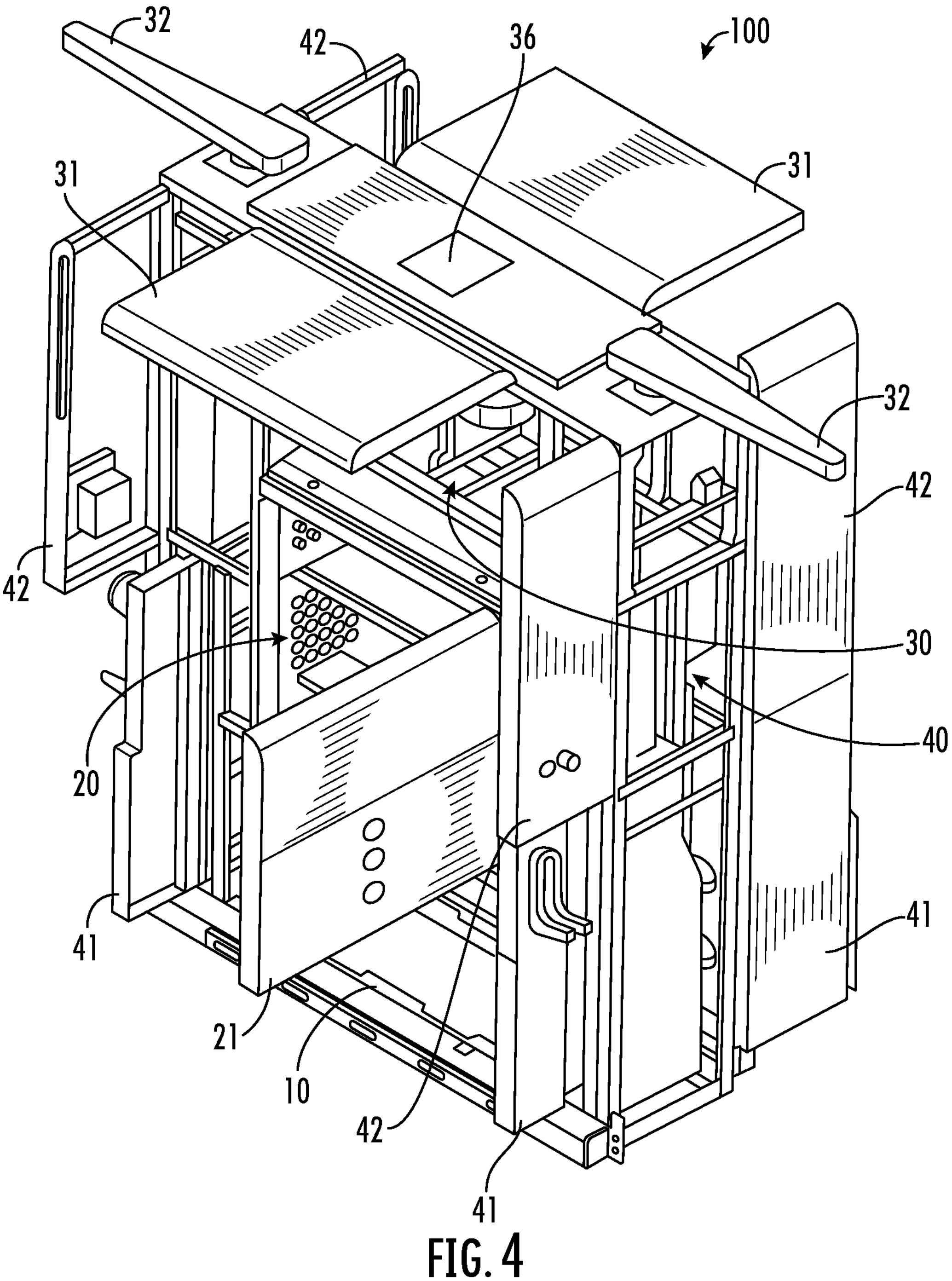
FIG. 4 is a perspective view showing a state in which various panels are opened in the illustrated embodiment.

In FIG. 4, which shows a state in which various panels provided in each unit of the gas filling device 100 are opened, each unit is provided with a panel. That is, the intermediate unit 20, the top unit 30, the lower part of the side unit 40, the upper part of the side unit 40 and the lower unit 10 are provided with a display panel (front panel) 21, a front upper panel 31, a front side lower panel 41, a front side upper panel 42 and a front lower panel, respectively. In order to avoid complication of the drawings, illustration of the front lower panel is omitted. In FIG. 4, the display panel 21, the front side lower panel 41, and the front side upper panel 42 are shown opening laterally, and the front upper panel 31 is shown opening upward. In FIG. 4, the reference numeral 32 indicates a support arm for supporting the operation of the filling nozzle and the filling hose, and the reference numeral 36 indicates an explosion door as a safety device. In the illustrated embodiment, the front side is the one with a counter (display section, filling amount indicator). For example, if the gas filling device is capable of filling a vehicle from both sides, the counter (display section, filling amount indicator) will be on both sides, and both will be on the front.

Although not clearly illustrated, in the illustrated embodiment, there are no welding points between the units in the gas filling device 100. Panels that were previously fixed by welding are now attached with adhesive. Here, if the panel is fixed to the unit by welding, the welding marks will be noticeable even after the panel is attached, and it will look bad. Then, when grinding with a sander to remove welding marks, the plating film is also removed, resulting in a decrease in corrosion resistance. In the illustrated embodiment, there are no welds, and since the panel is glued to the unit, there are no weld marks, and the appearance is good.

In addition to this design effect, the work of grinding away welding marks with a sander becomes unnecessary. Furthermore, since the plating film is not removed by polishing away the welding marks, corrosion resistance does not deteriorate. In addition, since there are no welding points, there are no irregularities, and the sides on which the corresponding panels of each unit (the display panel 21, the front upper panel 31, the front side lower panel 41, the front side upper panel 42) are installed are flush with each other which improves the appearance of the panel.

Referring again to FIGS. 1 and 2, a large number of positioning holes LH are bored (formed) in the frame of each unit. The positioning hole LH can be formed at the joint location (overlapping location) between the units or corresponding to the joint location with the equipment in each unit. In FIG. 1, in order to avoid complexity, only some of the positioning holes LH are shown by lead lines. Machining the positioning holes LH allows equipment installation locations and joint locations between units to be determined with case when installing various filling equipment in each unit or when assembling units with various equipment installed. Then, a bolt, which is a fastening member, is inserted into the positioning hole LH at the device installation location or the joint location between the units. In other words, since the joining work is performed by inserting the bolt into the positioning hole LH, the equipment installation work and the assembly work of the units are easy, and the workability is also good. In addition, it is possible to easily and reliably determine equipment installation locations and joint locations between units, and the relative positional relationship between equipment is also accurately determined, so that the relative position of a device such as a heavy gas pipe cooling unit (including the heat exchanger 13, piping, etc.) and a device connected via piping can also be accurately specified using the positioning hole LH. Therefore, even an unskilled person can accurately connect each of the primary side piping and the secondary side piping without damaging the metal seal located between the gas pipe cooling section. As a result, leakage of hydrogen gas due to damage to the metal seal can be prevented. A specific example of how to connect the units to each other and to devices in each unit using the positioning hole LH in the frame of each unit will be described later with reference to FIG. 5.

Figure 5:
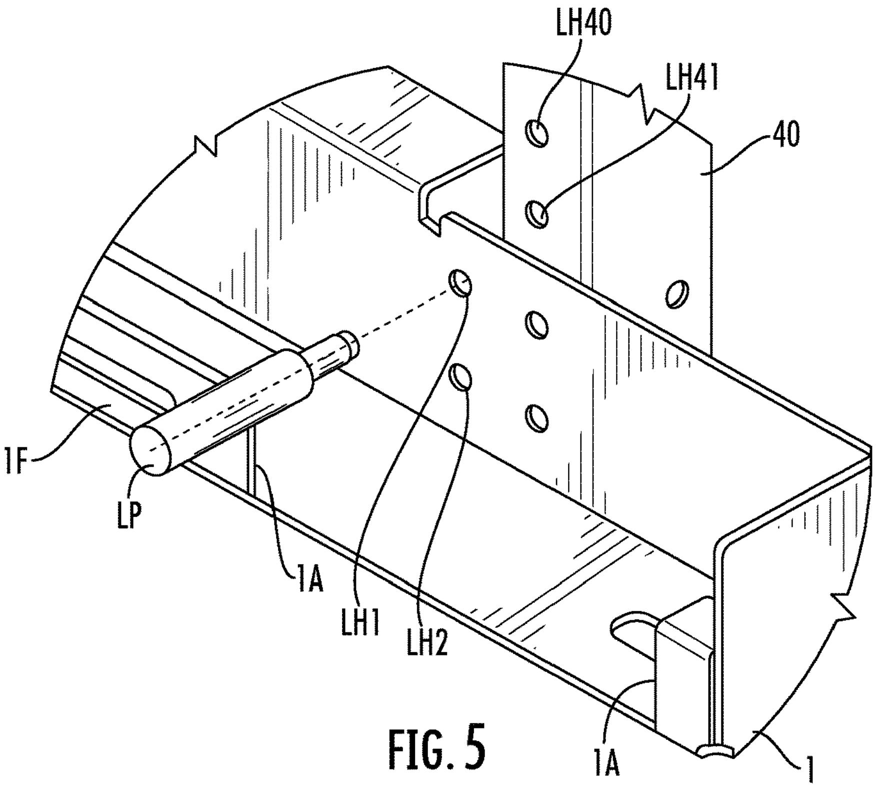
FIG. 5 is an enlarged explanatory perspective view showing a mode of coupling a base frame and a side unit.

FIG. 5 shows a mode in which the base frame 1 disposed below the lower unit 10 (FIGS. 1 to 3) and the vicinity of the lower end of the side unit 40 are coupled. In FIG. 5, a notch 1A is formed near the right end of the base frame 1, and the notch 1A is formed in the front surface 1F of the base frame 1. Although not clearly shown in FIG. 5, the notches 1A are formed near both left and right ends of the base frame 1. A positioning hole LH1 is formed in the base frame 1 on the side unit 40 side (upper right side in FIG. 5), and a positioning hole LH40 is formed in the side unit 40 at a position corresponding to the positioning hole LH1. Although shown off-centered in FIG. 5, the positioning holes LH1 and LH40 are formed at positions that align (overlapping positions) when the base frame 1 and the side unit 40 are combined. A single locate pin LP can be inserted into the positioning holes LH1 and LH40. The positioning holes LH1 and LH40 are used for inserting and temporarily fixing the locate pin LP. After temporary fixing with the locate pin LP, the fastening hole LH2 and the fastening hole LH41 on the side unit 40 side are used as holes for inserting a fastening bolt to perform fastening. In other words, the base frame 1 and the side unit 40 each include positioning holes LH1 and LH40 into which the locate pin LP is inserted for positioning (temporary fastening), and fastening holes LH2 and LH41 into which the fastening bolt is inserted and fastened after positioning are formed respectively.

When joining (assembling) the base frame 1 and the side unit 40, the locate pin LP is inserted into the positioning hole LH1 on the base frame 1 side via the notch 1A, and then the locate pin LP penetrates the positioning hole LH40 on the frame side of the side unit 40 to temporarily fix the base frame 1 and the side unit 40. In this state, a bolt (not shown) is inserted for fastening the units together into the fastening hole LH2 on the base frame 1 side and the fastening hole LH41 on the side unit 40 side, and a nut (not shown) is used to tighten the base frame 1 and the side unit 40. After that, the locate pin LP inserted into the positioning holes LH1 and LH40 is pulled out. When connecting units (during assembly), if they are connected using bolts and nuts from the beginning, assembly errors will accumulate, and in the later stages of the assembly process, the accumulated errors (misalignment) will become larger, and bolts and nuts cannot be connected. On the other hand, as in the illustrated embodiment, before the units are joined together (for example, the base frame 1 and the side unit 40 are joined with bolts), the locate pin LP is used to temporarily fix the base frame 1 and the side unit 40, which does not cause the cumulative error to become large even in the post-assembly process, and the bolts and nuts can be fastened easily and smoothly. In addition, distortion of the frame structure can be reduced.

Although FIG. 5 shows an example of the connection between the base frame 1 and the side unit 40, that is, the connection between the units, the same method as described above can be applied to the connection between the unit and the equipment to be installed in the unit. For example, as described above, when connecting and fixing a heavy gas pipe cooling section (including the heat exchanger 13, piping, etc., see FIG. 3) to the lower unit 10, first temporarily fixing it with a locate pin or temporarily assembling the equipment and then tightening it with bolts and nuts allows the equipment to easily and accurately installed without increasing errors during equipment installation. Although not shown, inserting a binding band into the positioning hole after assembly enables the wiring to be arranged in a bundle, for example.

Figure 7:
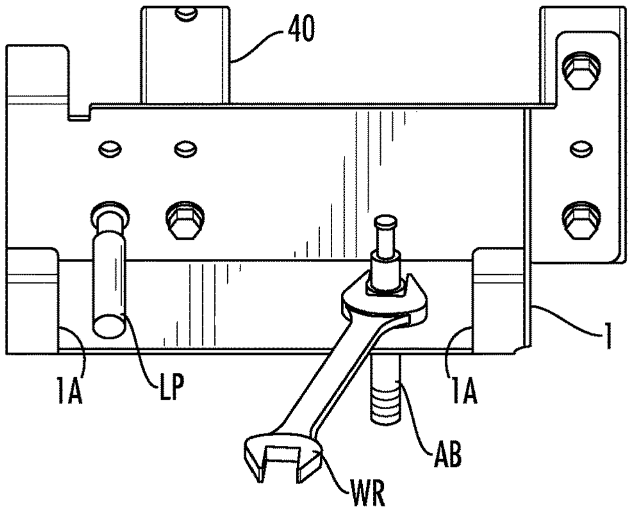
FIG. 7 is an explanatory view showing an enlarged view of a section A in FIG. 6.

Next, the installation work of the base frame 1 will be explained with reference to FIGS. 6 and 7. In FIG. 6, a notch 1A is formed in the base frame 1 at the lowest part (foundation part) of the gas filling device 100. The notch 1A in FIG. 6 is the same as the notch 1A explained in FIG. 5. When installing the gas filling device 100 at a predetermined position (installation position) in a hydrogen station, the base frame 1 is fixed (installed) at the installation position within the station with anchor bolts AB. When fixing the base frame 1 to the installation position with the anchor bolts AB, it is necessary to tighten the anchor bolts AB with a wrench WR, but the workability of tightening the anchor bolts AB has conventionally been poor. In the conventional base frame 1, the front part 1F extending vertically on the front side was composed of a flat member (in the conventional gas filling device, the notch 1A was not formed in the front part 1F). Therefore, the bolt head of the anchor bolt AB may be difficult to see from the operator due to the front part 1A, and it is difficult to tighten the bolt head of the anchor bolt AB beyond the front part 1F with the wrench WR.

On the other hand, in the illustrated embodiment, as described above, the notch 1A is formed in the front part 1F of the front side of the base frame 1 (viewer side in FIG. 6), so the above-mentioned problem is solved. In addition to the above-mentioned tightening work of the anchor bolt AB, FIG. 7 also shows an aspect of the work of temporarily fastening the base frame 1 and the side unit 40 using the locate pin LP mainly explained with reference to FIG. 5. Although not clearly illustrated, in FIGS. 6 and 7, the notches 1A are formed near both ends of the base frame 1 in a horizontal direction. That is, in the illustrated embodiment, the work of assembling the base frame 1 and the side unit 40 and the work of fixing the base frame 1 to a predetermined position in the station with the anchor bolts AB are performed near both left and right ends of the base frame 1.

Figure 8:
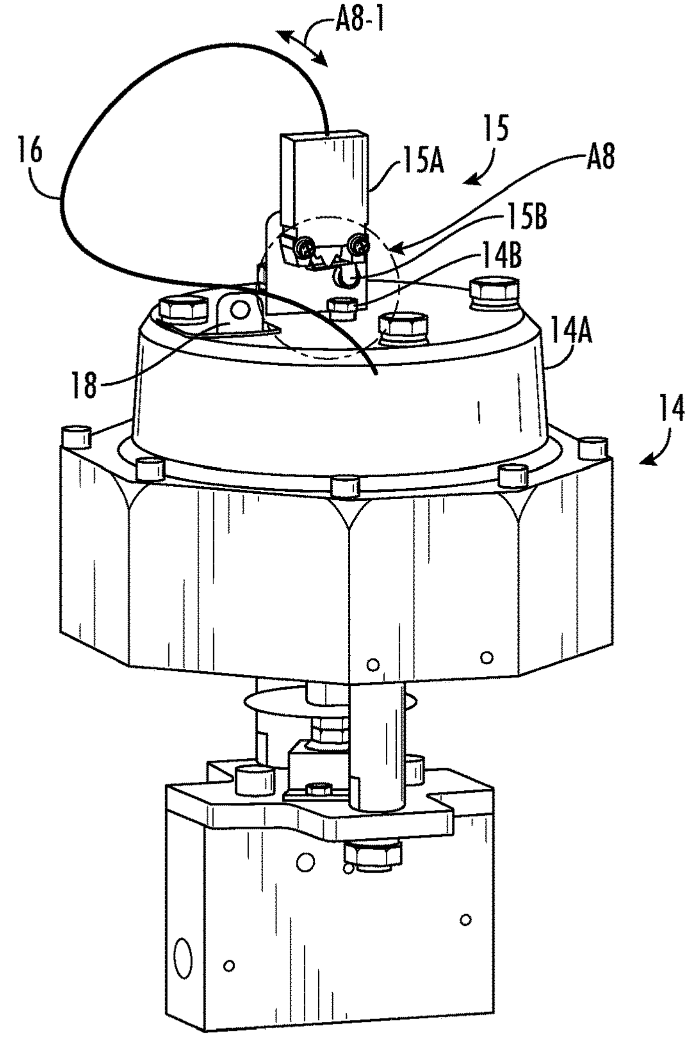
FIG. 8 is a perspective view showing a pressure relief valve used in the embodiment.
Figure 9:
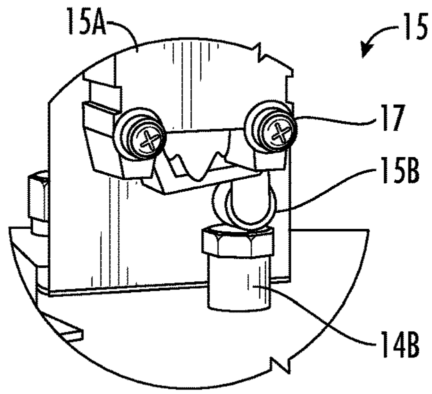
FIG. 9 is a partially enlarged view showing a sensing part and a movable part of a limit switch of the pressure relief valve, showing a state where the sensing part and the movable part are in contact with each other.
Figure 10:
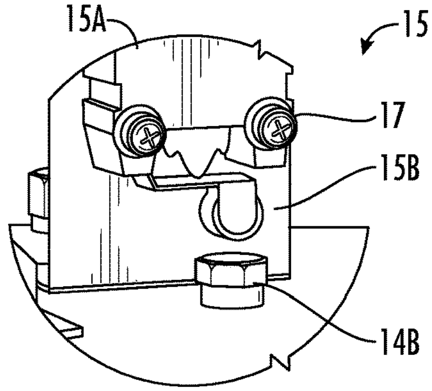
FIG. 10 is a partially enlarged view similar to FIG. 9, showing a state in which the sensing section and the movable section are separated from each other.

Referring to FIGS. 8 to 12, the pressure relief valve 14 (the inlet side pressure relief valve: see FIG. 3) and its switch portion 15 in the illustrated embodiment will be described. FIG. 8 shows the pressure relief valve 14 and its switch portion 15 used in the illustrated embodiment, and the switch portion 15 is disposed at the top of a main body portion 14A of the pressure relief valve 14. The switch section 15 has a main body section 15A and a sensing section 15B, and a cable 16 is connected to the main body section 15A. FIG. 9 is a partially enlarged view of an area A8 indicated by a broken circle in FIG. 8. In FIG. 9, when the pressure relief valve 14 is activated, the movable portion 14B rises and contacts the sensing portion 15B, and a signal confirming that the pressure relief valve 14 has been activated is output from the main body 15A of the switch portion 15 via the cable 16. On the other hand, as shown in FIG. 10, which is an enlarged view of the area A8 in FIG. 8, if the movable part 14B of the pressure relief valve 14 does not rise and the movable part 14B does not contact the sensing part 15B, the pressure relief valve 14 does not operate. The switch section 15 accordingly outputs the operating status of the pressure relief valve 14 as a signal. In FIGS. 9 and 10, the reference numeral 17 indicates a mounting screw for attaching the main body portion 15A to the bracket 18.

Figure 11:
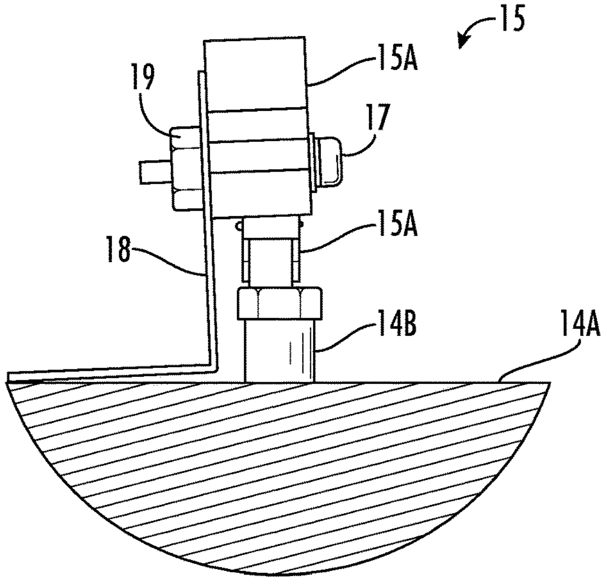
FIG. 11 is an explanatory view showing the effect of a state in which the sensing part and the movable part are in contact with each other in the embodiment.

In FIG. 8, the cable 16 moves, for example, in the direction of an arrow A8-1, and the connected main body 15A also swings, which may cause the switch base to malfunction, or the mounting screw 17 (see FIGS. 9 and 10) may come loose. On the other hand, in the illustrated embodiment, as shown in FIG. 11, the switch portion 15 is attached to the top of the pressure relief valve body 14A via a bracket 18, which is an elastic L-shaped sheet metal member fastened to the body portion 15A by a fastening member 19.

Furthermore, fixing the cable 16 to the mounting bracket 18 attached to the top of the main body part 15A prevents, even if the cable 16 fluctuates violently, malfunction of the switch part 15 (switch base) as well as looseness of the mounting screw 17.

Figure 12:
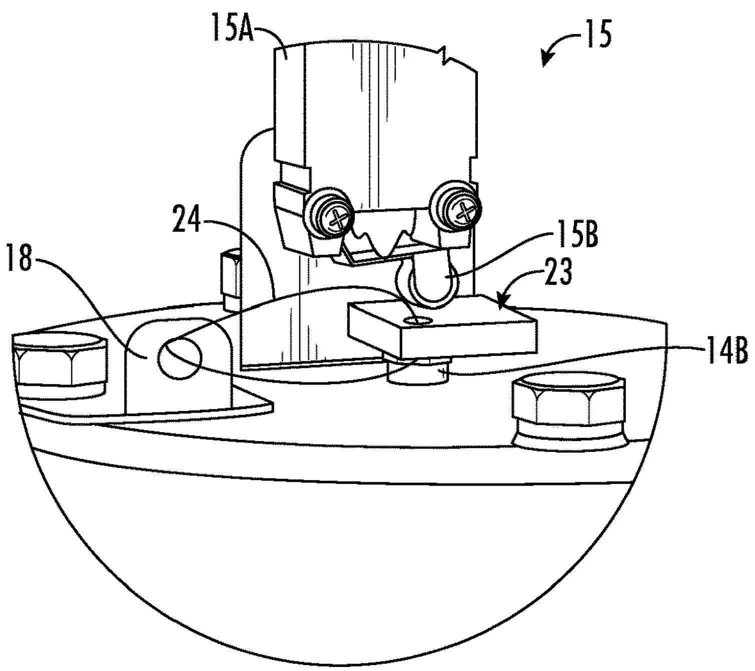
FIG. 12 is a perspective view showing a spacer used in the limit switch of the pressure relief valve.

In FIG. 12, for positioning the sensing section 15B of the switch section 15, a spacer 23 having a thickness of, for example, 5 mm is attached to the mounting bracket 18 via a flexible member 24 (string, chain, etc.). The thickness of the spacer 23 (for example, 5 mm) is set to be the same as the stroke of the movable part 14B that moves in a vertical direction. When assembling the switch section 15, it is necessary to adjust the stroke of the movable section 14B. When adjusting the stroke of the movable part 14B, if the spacer 23 is used, the stroke can be easily adjusted, and the arrangement and relative positional relationships of various parts can be easily and accurately adjusted. In the illustrated embodiment, the spacer 23 is attached to the mounting bracket 18 via the flexible member 24, so that when the stroke of the movable part 14B needs to be adjusted, the adjustment can be made immediately using the spacer 23. Therefore, not only during assembly, but also during various maintenance inspections of the gas filling device, the operator can carry out the necessary work without having to carry around the spacer 23 and without having to search for the spacer 23 during work, resulting in improved work efficiency.

Figure 13:
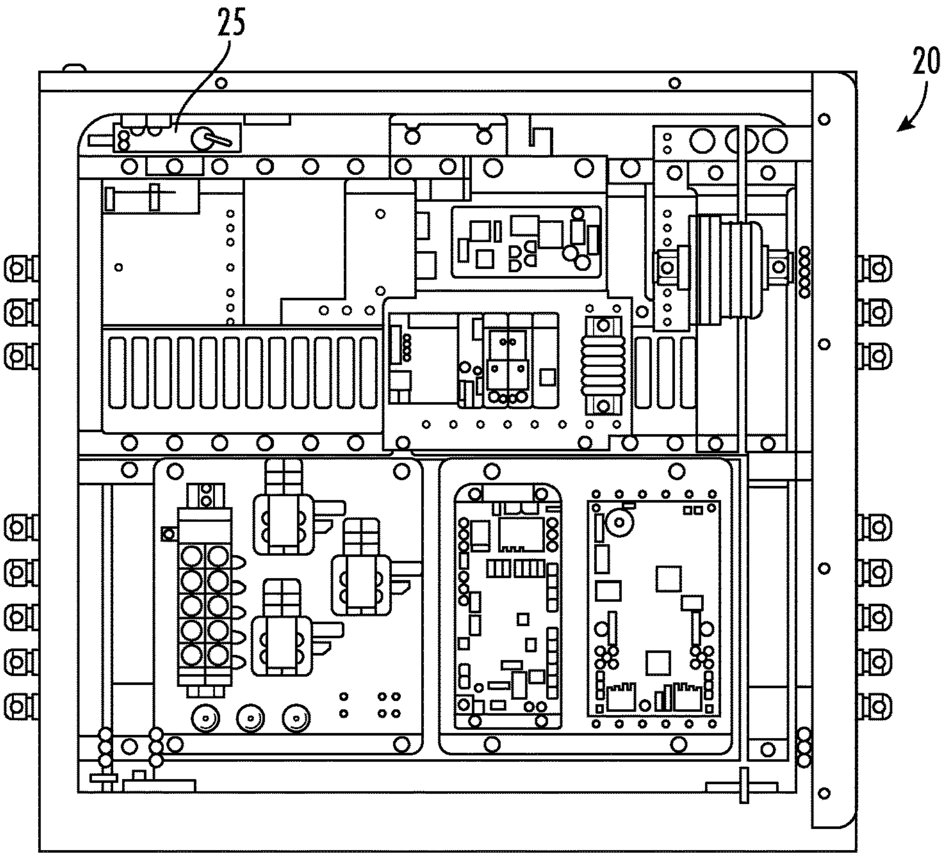
FIG. 13 is a front view showing a state in which an IR box is housed in an intermediate box in the embodiment.
Figure 14:
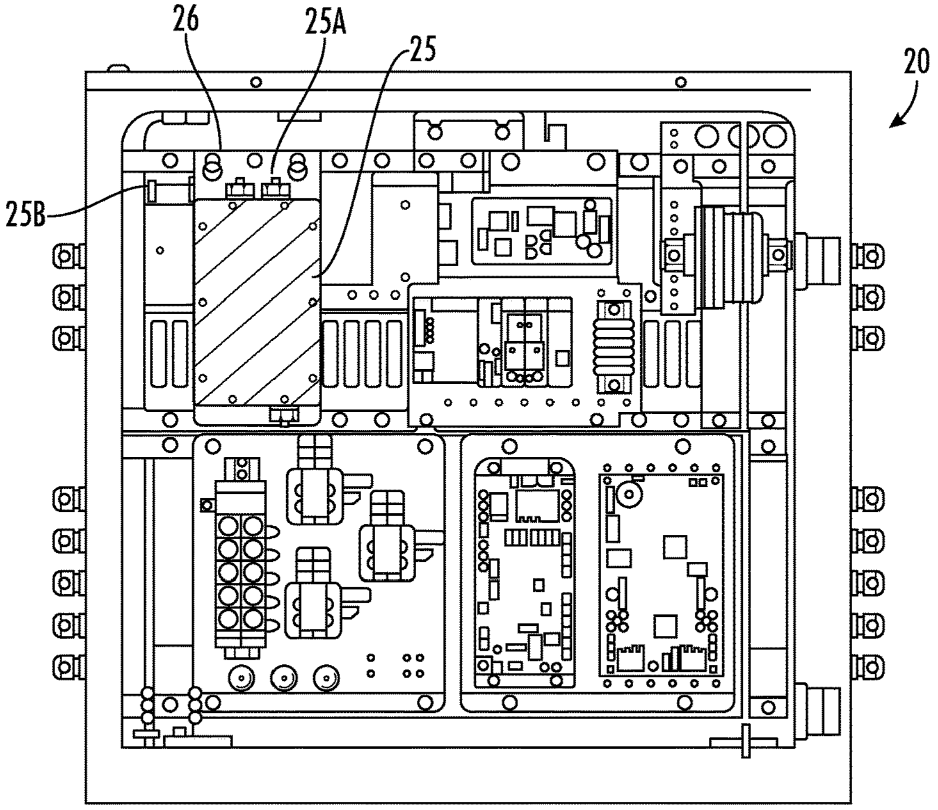
FIG. 14 is a front view showing a state in which the IR box is pulled out and held from the state shown in FIG. 13.

An infrared box (IR box) for communication filling in the illustrated embodiment will be described with reference to FIGS. 13 and 14. The IR box is not a device that is handled by workers during normal filling work, but for example, when performing maintenance work such as updating programs or inspecting and connecting cables (for example, wiring work), the box is opened to do the work. The frequency of opening the IR box is low. In the illustrated embodiment, under normal conditions (when the IR box is not opened), the IR box 25 is stored in a space above the intermediate unit 20 (see FIGS. 1 to 3), as shown in FIG. 13. The IR box 25 has a rectangular parallelepiped shape with a predetermined thickness. In FIG. 13, in the stored state, the IR box 25 is stored in a space existing at the upper left corner of the intermediate unit 20 so that its longitudinal direction is perpendicular to the plane of the paper in FIG. 13. When performing work with the IR box 25 open (although this is infrequent), such as maintenance work, the IR box 25 is pulled out from the space in the upper left corner of the intermediate unit 20, as shown in FIG. 14, located on the operator's side (front side: viewer's side or front side in FIG. 14). In FIG. 14, the main body of the IR box 25 that has been pulled out is shown with hatching. When the IR box 25 is pulled out, the pin 26 or a bolt protruding from the frame (not shown) in the intermediate unit 20 is inserted into the pothole 25B of the hook 25A to hold the IR box 25 with the hook 25A on the rear edge of the IR box 25 facing upward. Here, the pothole 25B and the pin 26 (or bolt) are provided at two locations in a horizontal direction in FIGS. 13 and 14. As shown in FIG. 14, if the IR box 25 is pulled out and held so that the work surface of the IR box 25 faces the operator, various operations such as program updates and cable wiring work such as inspection wiring and other maintenance work can be easily performed because the inside of the IR box 25 is exposed to the operator's face.

In the illustrated embodiment, a harness extends along a filling hose (not shown) to provide signal transmission during communication filling. A harness safety joint 43 of such a harness will be explained with reference to FIGS. 15 to 17. In the figures, the harness safety joint 43 has a harness 44 on the gas filling device (not shown) side, a harness 45 on the vehicle (not shown) side, and a main body 46. The harness 44 on the device side and the harness 45 on the vehicle side are configured to be separable. The main body 46 includes a connecting portion 46A that connects the harness 44 on the gas filling device side and the harness 45 on the vehicle side, a flange portion 46B on the gas filling device side, and a flange portion 46C on the vehicle side. A pressing protrusion 46AP is provided on the connecting portion 46A of the main body 46, and when the pressing protruding portion 46AP is pressed, the harness 45 on the vehicle side and the connecting portion 46A are separated, and the harness 44 on the gas filling device side and the harness 45 on the vehicle side are separated. As shown in FIG. 16, a harness through hole 46CH in the vehicle-side flange portion 46C is formed such that its inner wall shape gradually decreases in inner diameter as it goes downward.

Figure 15:
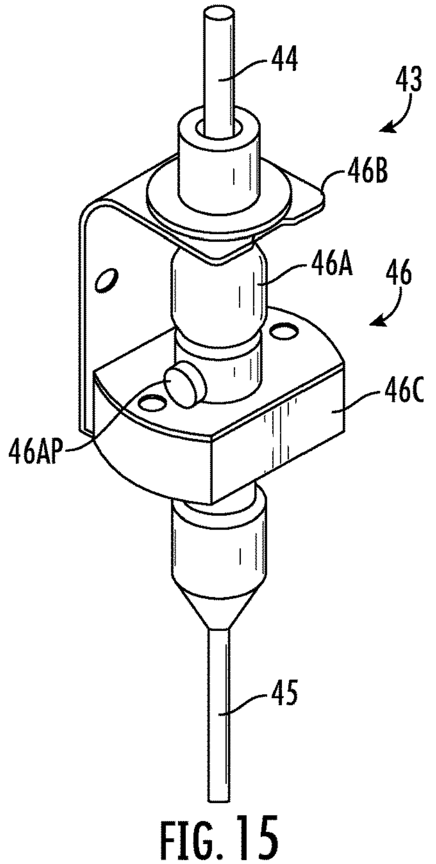
FIG. 15 is a perspective view of a harness safety joint used in the embodiment.
Figure 16:
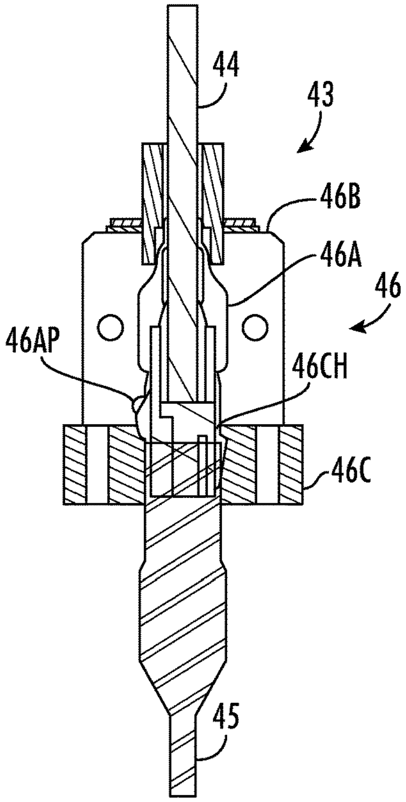
FIG. 16 is a longitudinal cross-sectional view of the harness safety joint shown in FIG. 15.
Figure 17:
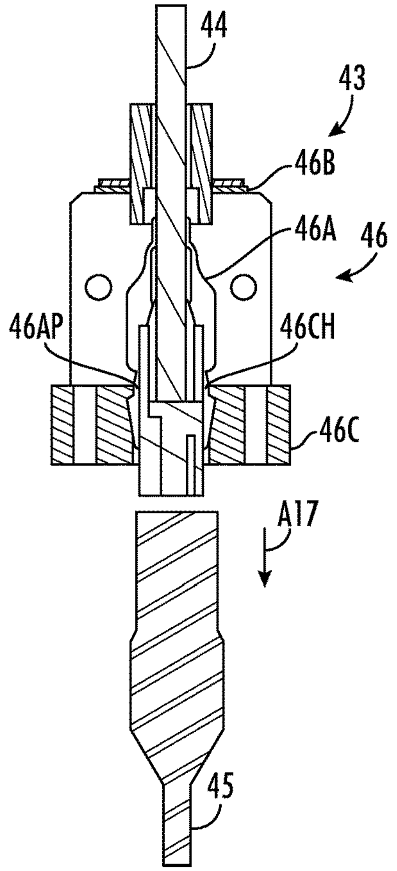
FIG. 17 is a longitudinal cross-sectional view similar to FIG. 16, showing the harness safety joint in a separated state.

For example, if the safety joint 43 is pulled toward the vehicle, as in the case where a vehicle (not shown) suddenly starts regardless of the intention of the operator or driver who is filling the gas, the harnesses 44, 45, and the main body 46 move downward in FIGS. 15 to 17 (in the direction of an arrow A17 in FIG. 17). As described above with reference to FIG. 16, the inner diameter of the harness through hole 46CH in the flange portion 46C decreases smoothly as it goes downward (in the A17 direction), which causes, as shown in FIG. 17, the pressing protrusion 46AP of the connecting portion 46A to be pressed by the inner wall surface of the through hole 46CH of the flange portion 46C. As a result, as shown in FIG. 17, the harness 45 on the vehicle side and the connecting portion 46A are separated to split the harness safety joint 43 into two.

It should be noted that the illustrated embodiments are merely examples and are not intended to limit the technical scope of the present invention.

DESCRIPTION OF THE REFERENCE NUMERALS

1 base frame
1A notch
10 lower unit
13 heat exchanger
20 intermediate unit
30 top unit
33 flow meter
40 side unit
100 gas filling device
LH positioning hole

The invention claimed is:

1. A gas filling device comprising:
a lower unit housing a heat exchanger on a base frame;
an intermediate unit located above said lower unit and housing a display;
a top unit located above said intermediate unit and housing a flow meter; and
side units located on both sides of said lower unit and said intermediate unit and housing filling hoses having filling nozzles at their tips.

2. The gas filling device as claimed in claim 1, wherein each unit is provided with a positioning hole, and a pin can be inserted into the positioning hole formed at a location where each unit overlaps.

3. The gas filling device as claimed in claim 2, wherein said positioning hole is configured so that said pin can be removed.

4. The gas filling device as claimed in claim 2 or 3, wherein said positioning hole is configured such that a binding band can be inserted.

5. The gas filling device as claimed in claim 1 or 2, wherein said base frame is provided at a lowest part, and that the base frame has a notch formed therein.

6. The gas filling device as claimed in claim 3, wherein said positioning hole is configured such that a binding band can be inserted.

7. The gas filling device as claimed in claim 2, wherein said base frame is provided at a lowest part, and that the base frame has a notch formed therein.

* * * * *